United States Patent
Lintulahti

(10) Patent No.: US 11,156,212 B2
(45) Date of Patent: Oct. 26, 2021

(54) ACTUATING DEVICE AND METHOD FOR CONTROLLING SMA ACTUATOR WIRE

(71) Applicant: AAC Optics Solutions Pte. Ltd., Singapore (SG)

(72) Inventor: Tomi Lintulahti, Tampere (FI)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/729,511

(22) Filed: Dec. 30, 2019

(65) Prior Publication Data
US 2021/0199097 A1 Jul. 1, 2021

(51) Int. Cl.
*F03G 7/06* (2006.01)

(52) U.S. Cl.
CPC .................................. *F03G 7/065* (2013.01)

(58) Field of Classification Search
CPC ............ F03G 7/065; G01K 5/483; G12B 1/00
USPC .................................................. 60/526–528
See application file for complete search history.

(56) References Cited

U.S. PATENT DOCUMENTS

| | | | | |
|---|---|---|---|---|
| 8,830,335 | B2* | 9/2014 | Topliss | G02B 27/646 348/208.11 |
| 9,479,699 | B2* | 10/2016 | Brown | F03G 7/065 |
| 2010/0074608 | A1* | 3/2010 | Topliss | G02B 7/08 396/133 |
| 2011/0252781 | A1* | 10/2011 | Johnson | E21B 33/1277 60/527 |
| 2015/0135703 | A1* | 5/2015 | Eddington | F03G 7/065 60/528 |
| 2015/0346507 | A1* | 12/2015 | Howarth | F03G 7/06 359/557 |

* cited by examiner

*Primary Examiner* — Shafiq Mian
(74) *Attorney, Agent, or Firm* — W&G Law Group

(57) ABSTRACT

The present disclosure provides an actuating device and a method for controlling an SMA actuator wire. The actuating device includes: a first support structure and a second support structure that are spaced from each other to define a movement space; a movable element received in the movement space; an SMA actuator wire configured to drive the movable element to move in the movement space; a detection element configured to detect movement information; and a control element configured to adjust a power state of the SMA actuator wire based on the movement information in such a manner that the SMA actuator wire is in a loose state after the SMA actuator wire drives the movable element to be fixed to the second support structure. This can alleviate the technical problem in the related art that the SMA actuator wire is prone to failure when the lens is suffering collision or falling.

2 Claims, 2 Drawing Sheets

ACTUATING DEVICE AND METHOD FOR CONTROLLING SMA ACTUATOR WIRE

TECHNICAL FIELD

The present disclosure relates to the technical field of electronic devices, and in particular, to an actuating device and a method for controlling an SMA actuator wire.

BACKGROUND

In recent years, portable terminals similar to smart phones and tablet computers are equipped with high-performance lens driving devices, in addition to portable cameras.

In the related art, there are various types of SMA actuating devices functioning as controlling positions of a movable element. In such a device, an SMA actuator wire is connected between the movable element and a support structure by a tension force. The SMA actuator wire is advantageous as an actuator in such a device, especially due to its high energy density, which means that the SMA actuator for applying a given force needs to be small.

As an imaging sensor becomes larger, the lens will become larger and heavier, and thus there is a demand on a stronger SMA actuator wire. However, a thick SMA actuator wire will result in the actuator becoming slower and larger, while a thin SMA actuator wire, although involving good performance, will result in that the SMA actuator wire is prone to breakage or failure when a lens is suffering collision or falling.

SUMMARY

The present disclosure provides an actuating device and a method for controlling an SMA actuator wire, aiming to alleviate the technical problem in the related art that the SMA actuator wire is prone to failure when the lens is suffering collision or falling.

In a first aspect, the present disclosure provides an actuating device, including: a first support structure and a second support structure that are spaced from each other to define a movement space; a movable element received in the movement space; an SMA actuator wire configured to drive the movable element to move in the movement space, the SMA actuator wire comprising: a first fixation end, a second fixation end, a third fixation end, a first connection section, and a second connection section, wherein the first fixation end and the second fixation end are fixed to the first support structure and spaced from each other, the third fixation end is fixed and connected to the movable element, the first connection section connects the first fixation end with the third fixation end, and the second connection section connects the second fixation end with the third fixation end; a detection element 14 configured to detect movement information; and a control element configured to adjust a power state of the SMA actuator wire based on the movement information in such a manner that the SMA actuator wire is in a loose state after the SMA actuator wire drives the movable element to be fixed to the second support structure.

In an implementation, the detection element 14 is an accelerometer, and the movement information comprises acceleration information; the accelerometer is configured to detect the acceleration information, and the control element is configured to adjust the power state of the SMA actuator wire based on the acceleration information in such a manner that the SMA actuator wire is in the loose state after the SMA actuator wire drives the movable element to be fixed to the second support structure.

In an implementation, the detection element 14 is a gyroscope, and the movement information comprises angular velocity information; the gyroscope is configured to detect the angular velocity information, and the control element is configured to adjust the power state of the SMA actuator wire based on the angular velocity information in such a manner that the SMA actuator wire is in the a loose state after the SMA actuator wire drives the movable element to be fixed to the second support structure.

In an implementation, the detection element 14 is a displacement sensor, and the movement information comprises displacement information; the displacement sensor is configured to detect the displacement information, and the control element is configured to adjust the power state of the SMA actuator wire based on the displacement information in such a manner that the SMA actuator wire is in the loose state after the SMA actuator wire drives the movable element to be fixed to the second support structure.

In an implementation, the movable device includes a lens assembly including one or more lenses.

In an implementation, the lens assembly further includes a lens holder, and the one or more lenses are movably disposed on the lens holder.

In a second aspect, the present disclosure provides a method for controlling an SMA actuator wire. The method includes: providing a first support structure and a second support structure in such a manner that the first support structure and the second support structure are spaced from each other to define a movement space, in which a movable element is received; fixing the SMA actuator wire to the first support structure and the movable element, respectively; detecting, by a detection element 14, movement information; and adjusting, by a control element, a power state of the SMA actuator wire based on the movement information, in such a manner that the SMA actuator wire is in a loose state after the SMA actuator wire drives the movable element to be fixed to the second support structure.

In an implementation, the SMA actuator wire includes a first fixation end, a second fixation end, a third fixation end, a first connection section, and a second connection section. The first fixation end and the second fixation end are spaced from each other and are fixed to the first support structure, respectively. The third fixation end is fixed to the movable element. The first fixation end is connected to the third fixation end by the first connection section. The second fixation end is connected to the third fixation end by the second connection section.

In an implementation, the detection element 14 is configured to obtain a movement state parameter of an actuating device, and it is determined whether the actuating device is in a falling state based on the movement state parameter. When the actuating device is in the falling state, the detection element 14 transmits information on the falling state to the control element, and the control element performs control based on the information on the falling state, in such a manner that the SMA actuator wire is in the loose state after the SMA actuator wire drives the movable element to be fixed to the second support structure.

In an implementation, the movement state parameter includes at least one of a displacement, a velocity, an angular velocity, or an acceleration.

Further, when the acceleration is equal to the gravity acceleration, the actuating device is in a falling state.

The technical solution provided by the present disclosure can bring following beneficial effects.

In the present disclosure, the detection element 14 of the actuating device detects movement information, and the control element of the actuating device adjusts the power state of the SMA actuator wire based on the movement information, in such a manner that the SMA actuator wire is in a loose state after the SMA actuator wire drives the movable element to be fixed to the second support structure. The SMA actuator wire can be in a loose state or a tensioned state, so as to control a position of the movable element. When the actuating device is suffering collision or falling, the detection element 14 sends a message, so that the SMA actuator wire gets in the loose state after the SMA actuator wire drives the movable element to be fixed to the second support structure, thereby reducing the possibility of breakage or failure of the SMA actuator wire.

It should be understood that the foregoing general description and the following detailed description are merely exemplary and are not intended to limit the present disclosure.

BRIEF DESCRIPTION OF DRAWINGS

In order to more clearly illustrate technical solutions in embodiments of the present disclosure, the accompanying drawings used in the embodiments are briefly introduced as follows. It should be noted that the drawings described as follows are merely part of the embodiments of the present disclosure, other drawings can also be acquired by those skilled in the art without paying creative efforts.

REFERENCE NUMERALS

Figure 1:
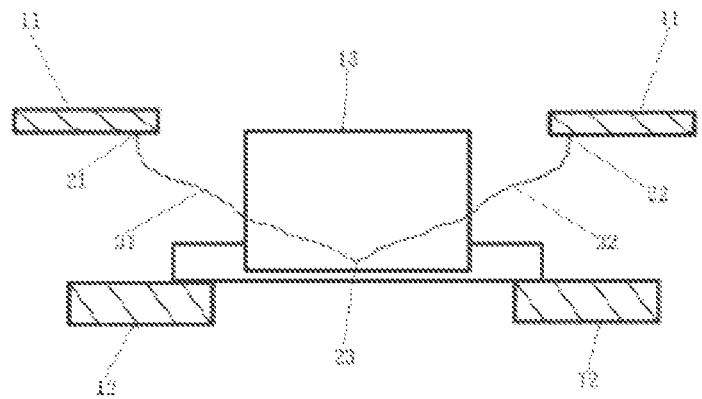
FIG. 1 is a diagram of a structure showing a loose state of an SMA actuator wire in an actuating device.

11—first support structure;
12—second support structure;
13—movable element;
21—first fixation end;
22—second fixation end;
23—third fixation end;
31—first connection section; and
32—second connection section.

The drawings herein are incorporated into and constitute a part of the present specification, illustrate embodiments of the present disclosure and explain principles of the present disclosure together with the specification.

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "I" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

An embodiment of the present disclosure provides an actuating device. The actuating device includes: a first support structure 11 and a second support structure 12 that are spaced from each other to define a movement space; a movable element 13 received in the movement space; and an SMA actuator wire for driving the movable element 13 to move in the movement space. The SMA actuator wire includes: a first fixation end 21, a second fixation end 22, a third fixation end 23, a first connection section 31, and a second connection section 32. The first fixation end 21 and the second fixation end 22 are fixed to the first support structure 11 and spaced from each other. The third fixation end 23 is fixed and connected to the movable element 13. The first connection section 31 connects the first fixation end 21 with the third fixation end 23, and the second connection section 32 connects the second fixation end 22 with the third fixation end 23. The actuating device further includes a detection element 14 configured to detect movement information, and a control element configured to adjust a power state of the SMA actuator wire based on the movement information in such a manner that the SMA actuator wire is in a loose state after the SMA actuator wire drives the movable element 13 to be fixed to the second support structure 12. For example, the control element can be a control circuit 15.

The detected information is transmitted to the control element from the detection element 14, and under control of the control element, the SMA actuator wire can be in a loose state or a tensioned state, so as to control a position of the movable element 13. When the actuating device is suffering collision or falling, the detection element 14 sends a message, so that the SMA actuator wire is in the loose state after the SMA actuator wire drives the movable element 13 to be fixed to the second support structure 12, thereby reducing the possibility of breakage or failure of the SMA actuator wire.

The SMA actuator wire can control the position of the movable element 13 on the second support structure 12. A plurality of SMA actuator wires can be provided, and their ends connect the movable element 13 with the first support structure 11 by means of a tension force. The SMA actuator wire can be arranged to be parallel with a movement direction or at an angle with the movement direction.

The actuating device can be a mobile phone, a camera, or an OIS. The movable element 13 can be a lens element. The actuating device can provide the OIS by movement of the lens element along an optical axis.

The first support structure 11 or the second support structure 12 includes a support block and a mechanical plug for supporting the movable element 13 and providing a movement space for the movable element 13. In addition, the first support structure 11 or the second support structure can be a base, a support plate, or the like.

The movable element 13 can be a lens element, a lens, or a lens assembly.

It should be noted that the SMA can be a shape memory alloy. A SMA material has a characteristic that solid-state phase transition occurs when being heated, which causes the SMA material to shrink. At a low temperature, the SMA material changes into a martensite phase. At a high temperature, the SMA material enters an austenite phase, which causes deformation and thus causes the SMA material to shrink. The SMA actuator wire can be made of any suitable SMA material.

When being heated, i.e., at a high temperature, the SMA actuator wire shrinks, and the movable element 13 moves along a first direction. When being cooled, i.e., at a low temperature, the SMA actuator wire expands, and the movable element 13 moves along a second direction. Here, the second direction is opposite to the first direction.

In an example, with information detected by the detection element 14, the SMA actuator wire can be loosened or tensioned by selectively driving current to pass through the SMA actuator wire. Here, heating can be directly achieved by the driving current, and cooling can be achieved by reducing or stopping the driving current, thereby controlling movement of the movable element 13.

As shown in FIG. 1, when the actuating device is in a power-off mode, that is, when the power is off, the SMA actuator wire is in the loose state after driving the movable element 13 to be fixed to the second support structure 12. In this case, the SMA actuator wire is loose and the movable element 13 is located at top of the second support structure 12.

Figure 2:
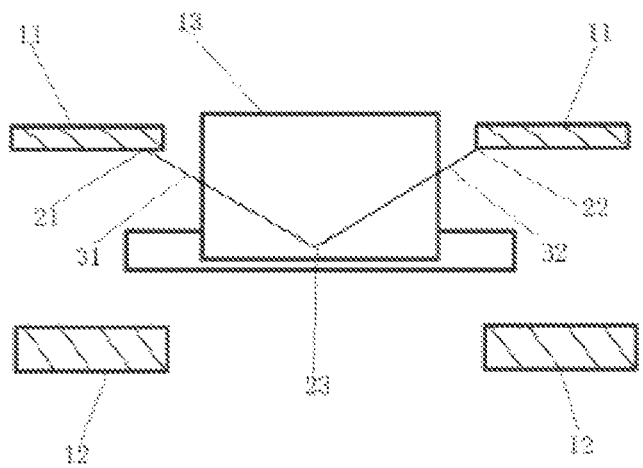
FIG. 2 is a diagram of a structure showing a tensioned state of an SMA actuator wire in an actuating device.

As shown in FIG. 2, when the actuating device is in a power-on mode, the SMA actuator wire will tighten and lift the movable element 13 in such a manner that the movable element 13 is disconnected from the second support structure 12. At this phase, a weight of the movable element 13 will affect the SMA actuator wire, especially when the camera is in a micro-distance, the SMA actuator wire is very short and cannot be stretched too much. Then, if the actuating device is suffering collision or falling, the SMA actuator wire is prone to breakage or failure. Therefore, when the actuating device is suffering collision or falling, the detection element 14 sends a message, so that the SMA actuator wire gets into the loose state, thereby reducing the possibility of the breakage or failure of the SMA actuator wire.

In a specific implementation, the detection element 14 is an accelerometer, and the accelerometer can output an acceleration signal representing an acceleration of the movable element 13 or the actuating device. The accelerometer is configured to detect acceleration information, and the power state of the SMA actuator wire is adjusted based on the acceleration information in such a manner that the SMA actuation wire is in the loose state after the SMA actuation wire drives the movable element 13 to be fixed to the second support structure 12. When it is determined that the movable element 13 or the actuating device is in a falling state or a collision state based on the acceleration signal, the driving current for driving the SMA actuator wire will be reduced or stopped, so that the SMA actuator wire is cooled, thereby loosening the SMA actuator wire and thus reducing the possibility of breakage or failure of the SMA actuator wire.

The accelerometer can detect an acceleration of the movable element 13 or the actuating device in real time, and the detected acceleration is compared with a preset acceleration threshold. If the detected acceleration is equal to or larger than the preset acceleration threshold, it is determined that the movable element 13 or the actuating device has suffered falling.

In a specific implementation, the detection element 14 is a gyroscope, and the gyroscope can output a signal representing an angular velocity of the movable element 13 or the actuating device, as a signal indicating whether the actuating device has suffered falling or collision. The gyroscope is configured to detect angular velocity information, and the power state of the SMA actuator wire is adjusted based on the angular velocity information in such a manner that the SMA actuator wire is in the loose state after the SMA actuator wire drives the movable element 13 to be fixed to the second support structure 12. If it is determined that the movable element 13 or the actuating device is in a falling state or a collision state based on the signal outputted by the gyroscope, the driving current for driving the SMA actuator wire will be reduced or stopped, so that the SMA actuator wire is cooled, thereby loosening the SMA actuator wire and thus reducing the possibility of breakage or failure of the SMA actuator wire. Here, the gyroscope can detect an angular velocity of the actuating device in real time, so as to determine whether the actuating device is in the falling state.

In a specific implementation, the detection element 14 is a displacement sensor, and the displacement sensor can output a signal representing a displacement of the movable element 13 or the actuating device, as a signal indicating whether the actuating device has suffered falling or collision. The displacement sensor is configured to detect displacement information, and the power state of the SMA actuator wire is adjusted based on the displacement information in such a manner that the SMA actuator wire is in the loose state after the SMA actuator wire drives the movable element 13 to be fixed to the second support structure 12. If it is determined that the movable element 13 or the actuating device is in a falling state or a collision state based on the signal outputted by the displacement sensor, the driving current for driving the SMA actuator wire will be reduced or stopped, so that the SMA actuator wire is cooled, thereby loosening the SMA actuator wire and thus reducing the possibility of breakage or failure of the SMA actuator wire.

In a specific implementation, the movable device includes a lens assembly, and the lens assembly includes one or more lenses which can move along a predetermined axis (such as the optical axis). For example, the lens element can include a lens carrier having a cylindrical shape, and the lens carrier supports the lens arranged along the optical axis.

In a specific implementation, the lens assembly includes a lens holder, and one or more lenses are movably disposed on the lens holder along the optical axis. The lens can move along the optical axis to achieve focusing.

Figure 3:
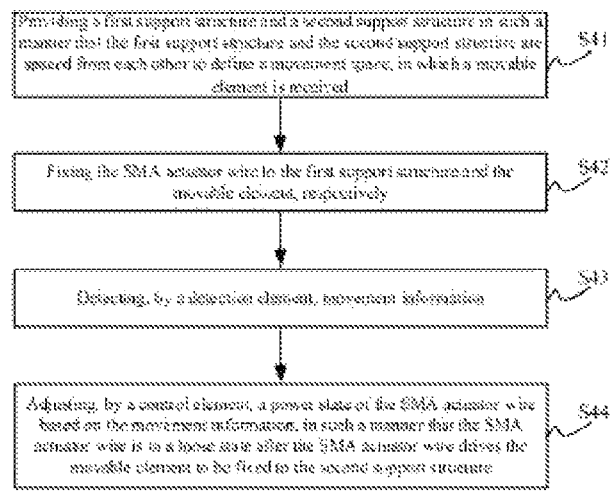
FIG. 3 is a flowchart of a method for controlling an SMA actuator wire according to an embodiment of the present disclosure.
Figure 4:
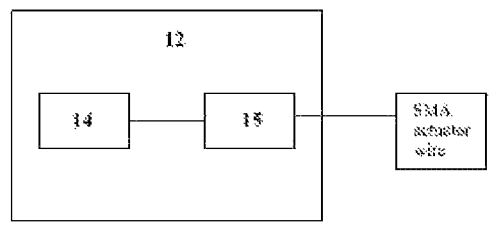
FIG. 4 is a diagram showing the connections of SMA actuator wire, the control circuit, the detection element and the second support structure according to an embodiment of the present disclosure.

As shown in FIG. 3, an embodiment of the present disclosure further provides a method for controlling an SMA actuator wire, including the following steps.

At step S41, a first support structure 11 and a second support structure 12 are provided in such a manner that the first support structure 11 and the second support structure 12 are spaced from each other to define a movement space, in which a movable element is received. At step S42, The SMA actuator wire is fixed to the first support structure and the movable element 13, respectively.

At step S43, movement information is detected by a detection element 14.

At step S44, a power state of the SMA actuator wire is adjusted based on the movement information by a control element, in such a manner that the SMA actuator wire is in a loose state after the SMA actuator wire drives the movable element 13 to be fixed to the second support structure 12.

If it is determined by the detection element 14 that the movable element 13 or the actuating device is in a falling state or a collision state, the SMA actuator wire will be driven in such a manner that the SMA actuator wire is loosened, thereby reducing the possibility of breakage or failure of the SMA actuator wire.

In a specific implementation, the SMA actuator wire includes a first fixation end 21, a second fixation end 22, and a third fixation end 23.

In the steps described above, the first fixation end 21 and the second fixation end 22 are provided spaced from each other and are respectively fixed to the first support structure 11, and the third fixation end 23 is fixed to the movable element 13.

The first fixation end 21 is connected to the third fixation end 23 by a first connection section 31, and the second fixation end 22 is connected to the third fixation end 23 by a second connection section 32.

In a specific implementation, the detection element 14 is configured to obtain a movement state parameter of the actuating device, based on which it is determined whether the actuating device is in a falling state. When the actuating device is in the falling state, the detection element 14 transmits information on the falling state to the control element, and the control element performs control based on the information on the falling state, in such a manner that the SMA actuator wire is in the loose state after the SMA actuator wire drives the movable element to be fixed to the second support structure.

In a specific implementation, the movement state parameter includes at least one of a displacement, a velocity, an angular velocity, or an acceleration.

In a specific implementation, when the acceleration is equal to the gravity acceleration, the actuating device is in the falling state.

For example, when a difference between the acceleration and the gravity acceleration is within a predetermined range, it can be determined that the actuating device is in the falling state.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. An actuating device in camera, comprising:
   a first support structure and a second support structure that are spaced from each other to define a movement space;
   a lens assembly received in the movement space;
   an SMA actuator wire configured to drive the lens assembly to move in the movement space, the SMA actuator wire comprising: a first fixation end, a second fixation end, a third fixation end, a first connection section, and a second connection section, wherein the first fixation end and the second fixation end are fixed to the first support structure and spaced from each other, the third fixation end is fixed and connected to the lens assembly, the first connection section connects the first fixation end with the third fixation end, and the second connection section connects the second fixation end with the third fixation end;
   a detection element fixed on the first support structure or the second support structure and configured to detect movement information of the actuating device; and
   a control circuit electrically connected with the detection element and the SMA actuator;
   when the actuating device is in a falling state, the detection element transmits information on the falling state to the control circuit, and the control circuit performs control based on the information on the falling state, in such a manner that the SMA actuator wire is in the loose state after the SMA actuator wire drives the lens assembly to be fixed to the second support structure.

2. The actuating device in camera as described in claim 1, wherein the detection element is one of an accelerometer, a gyroscope and a displacement sensor.

* * * * *